(12) United States Patent
Carmi (10) Patent No.: US 8,989,464 B2
(45) Date of Patent: Mar. 24, 2015

(54) FUNCTIONAL IMAGE DATA ENHANCEMENT AND/OR ENHANCER

(75) Inventor: Raz Carmi, Haifa (IL)

(73) Assignee: Koninklijke Philips N.V., Eindhoven (NL)

( * ) Notice: Subject to any disclaimer, the term of this patent is extended or adjusted under 35 U.S.C. 154(b) by 262 days.

(21) Appl. No.: 13/583,934

(22) PCT Filed: Feb. 17, 2011

(86) PCT No.: PCT/IB2011/050664
§ 371 (c)(1),
(2), (4) Date: Sep. 11, 2012

(87) PCT Pub. No.: WO2011/114243
PCT Pub. Date: Sep. 22, 2011

(65) Prior Publication Data
US 2013/0004038 A1 Jan. 3, 2013

Related U.S. Application Data

(60) Provisional application No. 61/315,053, filed on Mar. 18, 2010.

(51) Int. Cl.
*G06T 5/00* (2006.01)
*G06T 5/50* (2006.01)

(52) U.S. Cl.
CPC . *G06T 5/002* (2013.01); *G06T 5/50* (2013.01); *G06T 2207/10072* (2013.01); *G06T 2207/30004* (2013.01); *G06T 5/003* (2013.01)
USPC .......................................................... 382/128

(58) Field of Classification Search
CPC ........... G06T 5/00; G06T 5/50; G06T 7/0026; G06T 2207/10072; G06T 2207/10084; G06T 2207/20212; G06T 2207/20221; G06T 2207/30004
USPC .......... 382/128, 131, 154, 284; 600/407, 425, 600/430
See application file for complete search history.

(56) References Cited

U.S. PATENT DOCUMENTS

| | | | |
|---|---|---|---|
| 6,728,424 B1 * | 4/2004 | Zhu et al. ....................... | 382/294 |
| 6,740,883 B1 | 5/2004 | Stodilka et al. ........... | 250/363.04 |
| 6,878,941 B2 | 4/2005 | Balan et al. .............. | 250/363.02 |
| 7,348,564 B2 | 3/2008 | Wollenweber et al. .. | 250/363.04 |
| 2003/0004405 A1 * | 1/2003 | Townsend et al. ............ | 600/407 |
| 2003/0216631 A1 | 11/2003 | Bloch et al. ................... | 600/407 |
| 2004/0071325 A1 * | 4/2004 | Declerck et al. ............... | 382/128 |
| 2005/0226527 A1 | 10/2005 | Weese et al. .................. | 382/275 |

(Continued)

FOREIGN PATENT DOCUMENTS

WO 2009138898 A1 11/2009 .............. G06T 11/00

OTHER PUBLICATIONS

Alvarez, L., et al.; Image Selective Smoothing and Edge Detection by Nonlinear Diffusion; 1992; SIAM Journal of Numerical Analysis; 29(3)845-866.

(Continued)

*Primary Examiner* — Andrew W Johns (57) ABSTRACT

A method for enhancing functional image data includes obtaining functional image data, obtaining anatomical image data corresponding to the functional image data, and generating enhanced functional image data by diffusing the functional image data based on the functional image data and the anatomical image data.

27 Claims, 5 Drawing Sheets

(56) References Cited

U.S. PATENT DOCUMENTS

| | | | |
|---|---|---|---|
| 2007/0258908 A1 | 11/2007 | Lanza et al. | 424/9.322 |
| 2008/0064949 A1 | 3/2008 | Hertel et al. | 600/407 |
| 2008/0095414 A1 | 4/2008 | Desh et al. | 382/128 |
| 2008/0123922 A1 | 5/2008 | Gielen et al. | 382/131 |
| 2009/0202125 A1 | 8/2009 | Zhao et al. | 382/131 |

OTHER PUBLICATIONS

Boussion, N., et al.; Incorporation of wavelet-based denoising in iterative deconvolution for partial volume correction in whole-body PET imaging; 2009; European Journal of Nuclear Medicine and Molecular Imaging; 36(7), (abstract only).

Boussion, N., et al.; Fully Automated Partial Volume Correction in PET Based on a Wavelet Approach without the use of Anatomical Information; 2007; IEEE Trans. on Nuclear Science Symposium and Medical Imaging; Paper M12-5.

Boussion, N., et al.; Contrast enhancement in emission tomography by way of synergistic PET/CT image combination; 2008; Comput. Methods Probrams Biomed.; 90(3)191-201, (abstract only).

Catte, F., et al.; Image Selective Smoothing and Edge Detection by Nonlinear Diffusion; 1992; SIAM Journal on Numerical Analysis; 29(1)182-193.

Douiri, A., et al.; Anisotropic diffusion regularization methods for diffuse optical tomography using edge prior information; 2007; Measurement Science and Technology; 18:87-95.

Gerig, G., et al.; Nonlinear Anisotropic Filtering of MRI Data; 1992; IEEE Trans. on Medical Imaging; 11(2); 221-232.

Jin, J. S., et al.; An Adaptive Nonlinear Diffusion Algorithm for Filtering Medical Images; 2000; IEEE Trans. on Information Technology in Biomedicine; 4(4)298-305.

Kirov, A. S., et al.; Partial volume effect correction in PET using regularized iterative deconvolution with variance control based on local topology; 2008; Phys. Med. Biol.; 53:2577-2591.

Le Pogam, A., et al.; Conditional Partial Volume Correction for Emission Tomography: A Wavelet-based Hidden Markov Model and Multi-Resolution Approach; 2008; IEEE Trans. on Int'l Symposium on Biomedical Imaging; pp. 1319-1322, (first page only).

Perona, P., et al.; Scale-Space and Edge Detection Using Anisotropic Diffusion; 1990; IEEE Trans. on Pattern Analysis and Machine Intelligence; 12(7)629-639.

Soret, M., et al.; Partial-Volume Effect in PET Tumor Imaging; 2007; The Journal of Nuclear Medicine; 48(6)932-945.

Turkheimer, F. E., et al.; PET Image Denoising Using a Synergistic Multiresolution Analysis of Structural (MRI/CT) and Functional Datasets; 2008; Journal of Nuclear Medicine; pp. 657-666.

Weickert, J.; A Review of Nonlinear Diffusion Filtering; 1997; Int'l. Conf. on Scale-Space Theory in Computer Vision; pp. 3-28.

Whitaker, R. T.; Geometry-Limited Diffusion in the Characterization of Geometric Patches in Images; 1993; CVGIP Image Understanding; 57(1)111-120.

Wiemker, R., et al.; Combined motion blur and partial volume correction for computer aided diagnosis of pulmonary nodules in PET/CT; 2008; Int. J. CARS; 3:105-113.

* cited by examiner

FUNCTIONAL IMAGE DATA ENHANCEMENT AND/OR ENHANCER

CROSS REFERENCE TO RELATED APPLICATIONS

This application claims the benefit of U.S. provisional application Ser. No. 61/315,053 filed Mar. 18, 2010, which is incorporated herein by reference.

The following generally relates to enhancing functional imaging data and is described with particular application to a multi-modality imaging system in which one of the imaging systems of the multi-modality imaging system provides mainly functional information and another imaging system of the multi-modality imaging system provides mainly anatomical information. Separate functional and anatomical imaging systems are also contemplated herein.

With dual-modality imaging systems such as PET-CT, SPECT-CT and PET-MRI, the PET or SPECT imaging data has provided mainly functional information and the CT or MRI imaging data has provided mainly anatomical information. Outside of a common geometrical registration, radiation attenuation correction, and fusion visualization, little algorithmic interaction has been applied between the two information sets. For example, some attempts to utilize more advanced interactions were demonstrated for patient motion correction and for synergistic enhancement of functional images.

With respect to synergistic enhancement, the literature discloses techniques that attempt to improve the PET spatial resolution, enhance image contrast, correct partial-volume effects, reduce image-noise, and add to the functional images fine structures, which may appear in the anatomical images. These techniques are based mainly on mathematical techniques of wavelet decomposition, hidden Markov trees and regularized iterative deconvolution. Some of these approaches, for example, the hidden Markov trees, are complicated and can be difficult for optimization. Moreover, the published results show only partial improvements which are probably insufficient for reliable clinical usage.

Other related published techniques for dual-modality imaging use correlated physiological distribution of unique targeted CT contrast materials and PET radiotracers. With this technique, the CT images also provide functional information. Some other techniques attempt to correct motion artifacts in functional nuclear imaging data using anatomical data. Yet other techniques apply corrections to the PET images of lung nodules, providing that the nodules can be detected accurately on the CT images.

In view of the foregoing, there is an unresolved need for new and non-obvious systems and/or methods for using functional and anatomical imaging data.

Aspects of the present application address the above-referenced matters and others.

According to one aspect, a method for enhancing functional image data includes obtaining functional image data, obtaining anatomical image data corresponding to the functional image data, and generating enhanced functional image data by diffusing the functional image data based on the functional image data and the anatomical image data.

According to another aspect, a functional image data enhancer includes a processor that generates enhanced functional image data by applying a correlated nonlinear diffusion algorithm to functional image data.

According to another aspect, a computer readable storage medium encoded with instructions which, when executed by a computer, cause a processor of the computer to perform the step of: generating adapted functional image data in which structure in functional image data is adapted to structure in anatomical image data based on a correlation between the structure in the functional image data and the anatomical image data The invention may take form in various components and arrangements of components, and in various steps and arrangements of steps. The drawings are only for purposes of illustrating the preferred embodiments and are not to be construed as limiting the invention.

The following is directed towards enhancing functional image data based on the functional image data and on anatomical image data. In one instance, this includes enhancing functional image data using a correlated nonlinear diffusion approach in which structures of the functional image data are varied in a manner resembling their flow into structures of the anatomical image date. Generally, this occurs wherever the corresponding morphologies in the functional and anatomical image data are correlated, and a level of adaptation between the two image data sets can be selectable.

In some functional imaging modalities, the physiological functionality is expressed by the uptake level of a suitable tracer, marker, contrast material or the like which can be detected by the imaging system. However, in other functional imaging modalities, the functional information is expressed by measuring directly a biological signal such as in MEG and EEG which measure electromagnetic signals of the body. It is to be appreciated that the term uptake is used herein in general to describe any relevant functional image information.

It is to be appreciated that the functional and anatomical image data can be from multi-modality imaging systems such as PET-CT, SPECT-CT, PET-MRI, and pre-clinical CT with optical-imaging, and/or individual imaging systems. Other suitable imaging modalities include US, x-ray radiography, functional-MRI, magnetic particle imaging (MPI), infrared imaging, magneto-encephalography (MEG), electric-encephalography (EEG), and/or other imaging systems.

Figure 1:
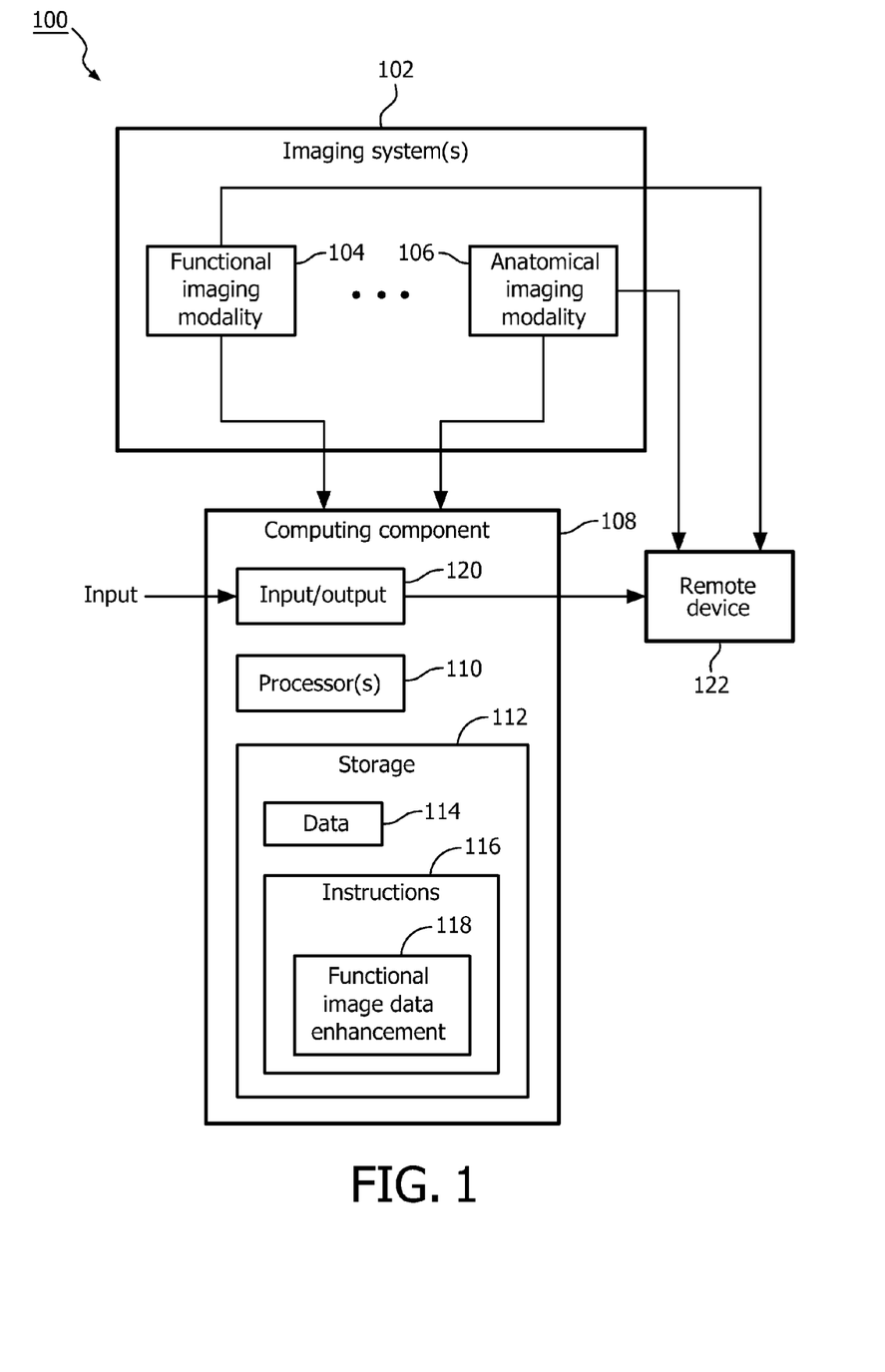
FIG. 1 illustrates an example multi-modality imaging system, including an imaging system for acquiring functional image data and an imaging system for acquiring anatomical image data, and a computing component configured to enhance functional image data based on the functional and anatomical image data.

FIG. 1 illustrates an example system 100. The system includes at least one imaging system 102. The illustrated imaging system 102 includes at least two sub-imaging systems, a first imaging system 104 that produces at least functional image data and a second imaging system 106 that produces at least anatomical image data. In another embodiment, the first imaging system 104 alternatively or additionally produces anatomical image data and/or the second imaging system 106 alternatively or additionally produces functional image data. In yet another embodiment, the first and second imaging systems 104 and 106 are separate individual systems.

The system 100 also includes a computing component 108 such as a workstation, a desktop computer, a laptop, a handheld computing device, or the like. The computing system includes one or more processor 110 and storage 112 such as computer readable medium encoded with data 114 and/or instructions 116 which, when executed by the processor 110, cause a computing system 108 to perform various acts. The illustrated storage 112 is encoded at least with functional image data enhancement instructions 118. Input/output 120 provides an interface for receiving input such as algorithm parameters and/or conveying information such as enhanced functional image data, for example, to one or more remote devices 122.

Examples of suitable remote devices 122 included, but are not limited to, a display, a computer, a database, a picture archiving and communication system (PACS), and/or other device. The enhanced functional image data can be visualized and/or further processed in connection with the original functional image data, the anatomical image data, and/or other image data. Additionally or alternatively, the functional image data enhancement instructions 118 can be stored and/or implemented via at least one of the first or second imaging systems 104 or 106, another imaging system, a PACS system, other computing component, and/or other system.

As described in greater detail below, in one instance the functional image data enhancement instructions 118 adapt structures in the functional image data to structures in the anatomical image data, e.g., at least where corresponding morphologies are correlated. Consequentially, a better adaptation between the functional to the anatomical information is obtained, relative to a configuration in which the functional image data enhancement instructions are omitted. In addition, this may allow image sharpening of the functional image data with higher signal-to-noise ratio (SNR), for example, where background-uptake is unchanged.

Hence, a better delineation of morphological structures in the functional image data can be achieved, and while obtaining more accurate functional image values. With respect to nuclear medicine as a representative example to a functional modality, this may result in improved clinical applications such as detection and functional assessment of small metastases, tumor contouring for radiotherapy planning and follow-ups, and quantitative assessment of radiotracer uptake. It may also facilitate reducing scanning time and/or radiotracer dose.

Figure 2:
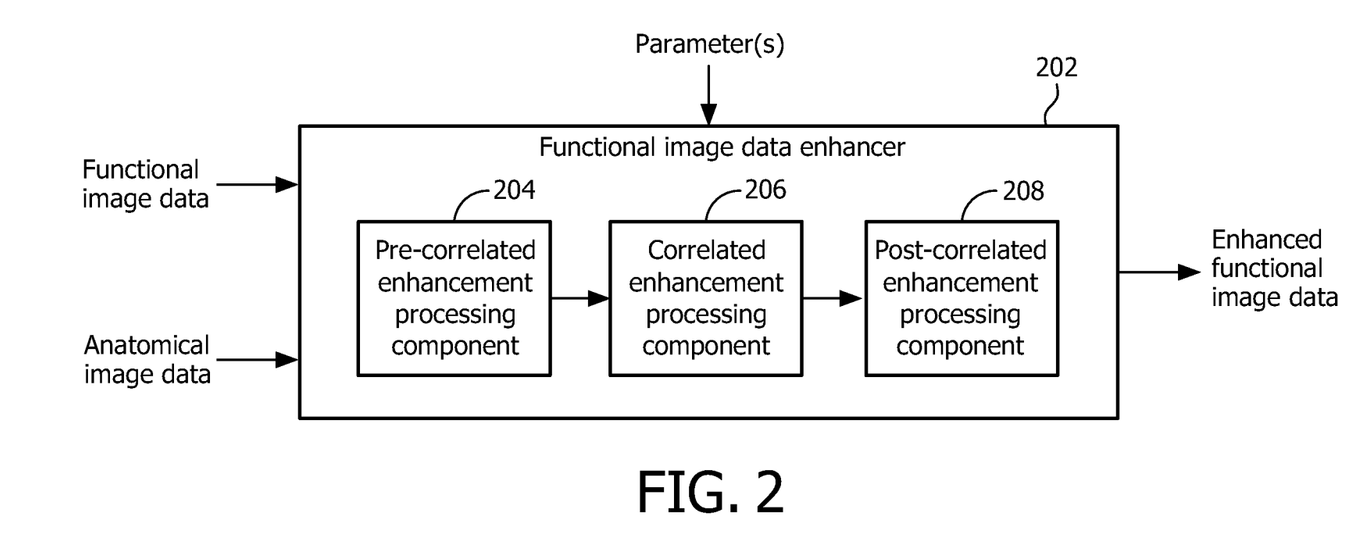
FIG. 2 illustrates an example functional image data enhancer that includes a functional image data enhancement processing component.

FIG. 2 illustrates a functional image data enhancer 202 that enhances functional image data based on anatomical image data. The functional image data enhancer 202 can be implemented via the processor 110 (FIG. 1) executing the functional image data enhancement instructions 118 (FIG. 1) and/or otherwise. The illustrated functional image data enhancer 202 receives functional image data, anatomical image data, and, optionally, one or more parameters. The functional image data and/or anatomical image data may include reconstructed image data. In one instance, various processing has been applied to the reconstructed image data, such as attenuation correction, spatial registration, etc.

The functional image data enhancer 202 includes a pre-correlated-enhancement processing component 204 that pre-processes the functional and/or anatomical image data. By way of example, in one non-limiting instance, the pre-correlated-enhancement processing component 204 re-samples the functional and/or anatomical image data. For example, in one instance this may include re-sampling the functional image data (or the anatomical image data) to fit a same voxel size and positions (e.g., in x, y, and/or z directions) as the anatomical image data (or the functional image data). In one instance, the image data with the relatively coarser sampling grid is pre-processed so that its image data fits the sampling grid of the image with the relatively finer sampling grid. In another instance, both sets of image data are re-sampled. In yet another instance, neither image data set is re-sampled.

In another non-limiting embodiment, the pre-correlated-enhancement processing component 204 applies a sharpening algorithm to at least one of the image data sets, such as the functional image data set. A suitable sharpening algorithm includes image deconvolution technique such as Lucy-Richardson deconvolution or other MLEM-based deconvolution. The sharpening can be applied via 2D-transaxial sharpening and/or 1D-axial sharpening, or a fully 3D sharpening. Other algorithms are also contemplated. In one instance, the sharpening significantly sharpens the functional image data with adding only moderate noise. The sharpening algorithm can be applied equally to the whole functional image data volume or a predetermined portion thereof.

In another embodiment, the pre-correlated-enhancement processing component 204 is omitted.

The functional image data enhancer 202 also includes a correlated-enhancement processing component 206. In the illustrated embodiment, the correlated-enhancement processing component 206 applies a correlated nonlinear diffusion algorithm to the pre-processed functional image data based on the anatomical image data. In one instance, this may include one or more of smoothing, edge-enhancing or de-forming the pre-processed functional image data in a nonlinear manner in which the gradients of the functional image data and the gradients of the anatomical image data control the smoothing/edge-enhancing/de-forming.

The anatomical image data may be smoothed in a different way or similar way, such as for purposes of the internal iterations of the enhancement algorithm. The correlated nonlinear diffusion algorithm may be a single or multi-iterative algorithm, for example, with a predetermined number of iterations. A non-limiting example of such an algorithm is shown in EQUATION 1:

$$\frac{\partial I_{functional}}{\partial t} = \nabla \cdot (g(|\nabla I_{anatomical}|) \cdot \nabla I_{functional}),  \quad \text{EQUATION 1}$$

where I corresponds to the values of the image data, t represents the algorithm iteration progress, and g is a nonlinear function, the del ($\nabla$) operators determine image gradients, and the del-dot ($\nabla \cdot$) operator determines the divergence.

With EQUATION 1, during image data processing, physiologically-functional information varies iteratively as a function of both the spatial gradients of the anatomical information and the spatial gradients of the functional information. The iterative variations occur in such manner that morphological structures of the functional information tend to adapt to correlated morphological structures of the anatomical information. The adaptation tendency increases as structural correlation increases.

In the illustrated embodiment, various input parameters are employed for image data enhancement. For example, one suitable parameter includes a sharpness parameter. Such a parameter may define a level of functional image data sharpening and related intensity-correction of small patterns with uptake that satisfies a predetermined uptake range. Another suitable parameter includes an adaptation parameter. This parameter may determine a level of functional to anatomical image data correlation-dependent morphological adaption.

Hence, this parameter controls a relative significance (or weight) given to the anatomical morphology. Another suitable parameter includes a background parameter. This parameter can be used to define a range of intensities in the functional image data considered as background-uptake that should not be enhanced. Additional and/or alternative parameters are also contemplated herein. In one non-limiting embodiment, for at least one of the parameters, a user or a default file can be used to set a parameter to on or off, low, medium or high, or otherwise.

The functional image data enhancer 202 also includes a post-correlated-enhancement processing component 208. Where the pre-correlated-enhancement processing component 204 upsamples and/or resizes image data, the post-correlated-enhancement processing component 208 can be used to downsample and/or re-size the image data, for example, based on the original image data voxel size and/or positions. In one instance, an anti-aliasing algorithm is employed to re-sample and/or resize the image data.

The output of the functional image data enhancer 202 includes, at least, enhanced functional image data. As discussed herein, the enhanced functional image data can be visualized and/or further processed with the original functional image data, the anatomical image data, and/or other image data.

It is to be appreciated that if local functional image data morphology is similar or correlated to the corresponding anatomical image data morphology, then the probability for enhancing the functional image data is high. However, if such local correlation does not exist, the local functional image data is not worsened. This feature may be advantageous where there is a lack of correlation such as in cases where physiological features that show functionality do not have corresponding notable anatomical morphology, and it can also mitigate artifacts due to patient motion or inaccurate spatial registration between the functional to the anatomical modalities.

Furthermore, the enhancement does not require any segmentation or complicated morphological analysis since the dependency on morphology is reflected through the image gradients. Thus, the enhancement can be applied in the same manner to the whole volume without the need to identify specific structures. In addition, the internal and/or user parameters do not impose sharp boundaries or thresholds, allowing flexible and intuitive adjustment.

Figure 3:
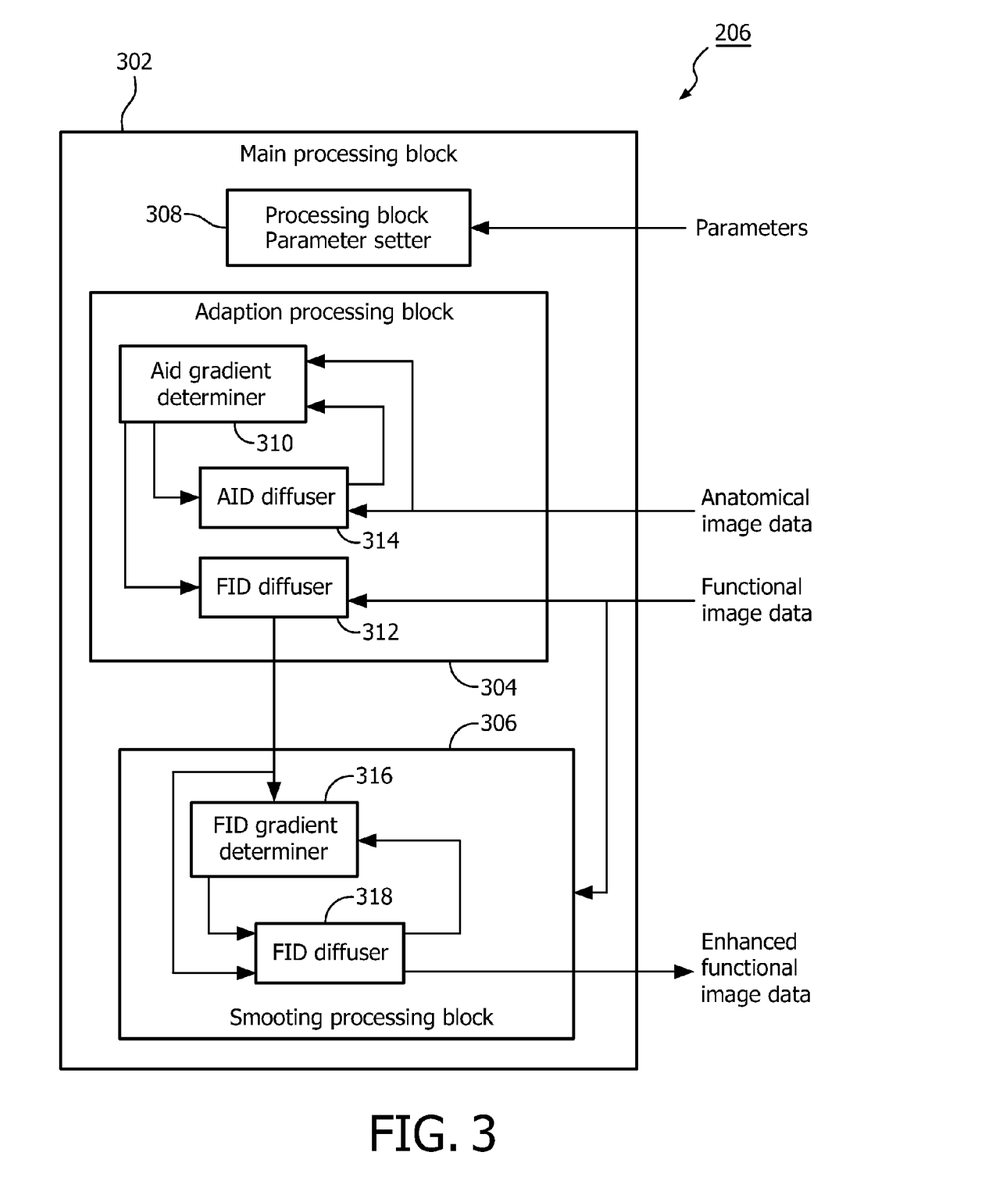
FIG. 3 illustrates an example functional image data enhancement processing component.

FIG. 3 illustrates an example embodiment of the correlated enhancement processing component 206 of FIG. 2. A main processing block 302 includes an adaption processing block 304 and a smoothing processing block 306, and a processing block parameter setter 308. The processing block parameter setter 308 includes parameters that indicate the number of iterations for the main block 302, the adaption processing block 304, and/or the smoothing processing block 306.

In the illustrated embodiment, the processing block parameter setter 308 updates one or more of the parameters for the adaption processing block 304 and/or the smoothing processing block 306 with each iteration of the main block 302. In one instance, the processing block parameter setter 308 may increase, in each iteration of the main block 302, the number of iterations of the block 304, relative to the previous iteration of 302. The processing block parameter setter 308 may also update, in each iteration of 302, the non-linear terms in the non-linear diffusion operator of 304 to decrease the gradient range for which the diffusion-flux has a positive slope, relative to the previous iteration of 302. This regulated parameter updating may result in performing a relatively stronger diffusion as the gradient magnitude decreases. This may facilitates balancing the adaptation effect to the sharpening and to the smoothing. It can also prevent spurious segmentation effect during the enhancement process.

The adaption processing block 304 includes an anatomical image data (AID) gradient determiner 310, a functional image data (FID) diffuser 312, and an anatomical image data (AID) diffuser 314. The adaption processing block 304 adapts functional image data morphologies to anatomical image data morphologies. The adaption processing block 304 is operated iteratively for a predetermined number of times, for example, as determined by the processing block parameter setter 308, and the number of iterations increases with each iteration of the main block 302.

The AID gradient determiner 310 determines a gradient of the anatomical image data. The gradient is used to control diffusion of both the functional and the anatomical image data. The functional image data diffuser 312 diffuses the functional image data based on the gradient. In one non-limiting instance, the functional image data is diffused with correlation to the diffusion of the anatomical image data. The anatomical image data diffuser 314 diffuses the anatomical image data based on the gradient. In one non-limiting instance, the anatomical image is also smoothed in a non-linear way manner. The output of the adaption processing block 304 is intermediate enhanced functional image data.

The smoothing processing block 306 includes a functional image data (FID) gradient determiner 316 and a functional image data (FID) diffuser 318. In the illustrated embodiment, the smoothing processing block 306 smoothes or blurs the intermediate functional image data based on a non-linear approach. In the illustrated instance, the smoothing processing block 306 is operated iteratively for a predetermined number of times, for example, as determined by the processing block parameter setter 308, and the number of iterations increases with each iteration of the main block 302.

The processing block parameter setter 308 may also update, in each iteration of 302, the non-linear terms in the non-linear diffusion operator of 306 to decrease the gradient range for which the diffusion-flux has a positive slope, relative to the previous iteration of 302. This regulated parameter updating may result in performing a relatively stronger diffusion as the gradient magnitude decreases, for example in accordance with the diffusion process of the adaption block 304.

In one instance, the smoothing facilitates creating a more realistic appearance of the functional image data, without excess noise and/or too artificial-looking adaptation to the anatomical image data. The FID gradient determiner 316 determines a gradient of the functional image data output by the adaption block 304 (the intermediate enhanced functional image data). The gradient is used to control diffusion of the adapted functional anatomical image data. The functional image data diffuser 318 diffuses the enhanced functional image data based on the gradient.

Generally, the main block 302 is iterated multiple times, and, for each iteration of the main block 302, the adaption processing block 304 and/or the smoothing processing block 306 is iterated multiple times. The output of the main block 302, after all iterations, is the enhanced functional image data.

As noted above, the computing component 108 (FIG. 1) applies a correlated nonlinear diffusion algorithm to enhance functional image data. The following provides a non-limiting example of a suitable correlated nonlinear diffusion algorithm.

A general differential equation of the nonlinear diffusion approach is shown in EQUATION 2:

$$\frac{\partial I}{\partial t} = \nabla \cdot (g(|\nabla I|) \cdot \nabla I), \quad \text{EQUATION 2}$$

where I the array of image pixel values and t is related to the iterations. g can be defined as shown in EQUATION 3:

$$g(|\nabla I|, \lambda) = 1 - \exp(-Cm/(|\nabla I|/\lambda)^m), \quad \text{EQUATION 3:}$$

where λ is variable and Cm is obtained through EQUATION 4:

$$Cm = \text{root}(1 - \exp(-x) - m \cdot x \cdot \exp(-x)). \quad \text{EQUATION 4:}$$

where m can be a constant parameter. With this form of g: F=0 where: |∇I|=0;
F=maximum where: |∇I|=λ; and F→0 where: |∇I|→∞, and the flux is: F=g(|∇I|)·∇I With one approach, the correlated nonlinear diffusion is such that changes in one image are related to the gradients of a second image. This enables the adaptation of the first image to the second image as a function of EQUATION 5:

$$\frac{\partial I_1}{\partial t} = \nabla \cdot (g(|\nabla I_2|, \lambda) \cdot \nabla I_1). \quad \text{EQUATION 5}$$

To adapt functional image data to patterns of the anatomical image data, the functional image data is used for $I_1$ and the anatomical image data is for $I_2$.

Table 1 illustrates example pseudo code for the diffusion.

TABLE 1

| | |
|---|---|
| 1. | $\begin{cases} I_1(i=1, t=0) = I_1(\text{input}) \\ I_2(i=1, t=0) = I_2(\text{input}) \end{cases}$ |
| 2. | For i = 1:N |
| 3. |   For t = 1: $n_2(i)$ |
| 4. |     $I_2(i, t) = I_2(i, t-1) + s \cdot [\nabla \cdot (g(|\nabla I_2(i, t-1)|, \lambda_2(i)) \cdot \nabla I_2(i, t-1))]$ |
| 5. |     $I_1(i, t) = I_1(i, t-1) + s \cdot [\nabla \cdot (g(|\nabla I_2(i, t-1)|, \lambda_2(i)) \cdot \nabla I_1(i, t-1))]$ |
| 6. |   End |
| 7. |   $I_1(i, v=0) = I_1(i, t=n_2(i))$ |
| 8. |   For v = 1:$n_1(i)$ |
| 9. |     $I_1(i, v) = I_1(i, v-1) + s \cdot [\nabla \cdot (g(|\nabla I_1(i, v-1)|, \lambda_1(i)) \cdot \nabla I_1(i, v-1))]$ |
| 10. |   End |
| 11. | $\begin{cases} I_2(i+1, t=0) = I_2(i, t=n_2(i)) \\ I_1(i+1, t=0) = I_1(i, v=n_1(i)) \end{cases} \forall (i < N-1)$ |
| 12. | $\begin{cases} n_2(i+1) \geq n_2(i); n_1(i+1) \geq n_1(i) \\ \lambda_2(i+1) < \lambda_2(i); \lambda_1(i+1) < \lambda_1(i) \end{cases} \forall (i < N-1)$ |
| 13. | End |
| 14. | $I_1(\text{final}) = I_1(i=N, v=n_1(N))$ |

The expression in line 1 defines the input functional image data and anatomical image data. Line 2 starts the iterations of the main block 302 (FIG. 3). Line 3 starts the internal correlated diffusion iterations of the adaption processing block 304. Line 4 relates to the diffusion of the anatomical image data as a function of its own gradients. Line 5 relates to the diffusion of the functional image data as a function of the anatomical image data gradients. Line 7 defines the intermediate enhanced functional image as an input to the smoothing processing block 306.

Line 8 starts the internal diffusion iterations of the smoothing processing block 306. Line 9 relates to the diffusion of the functional image data as a function of the functional image data gradients. Line 11 indicates the two-image values for the next external iteration of block 302. Line 12 describes the trends of updating the number of internal iterations and the nonlinear parameter (λ). Line 14 indicates the final result of the new functional image data. The factor s (in lines 4, 5, and 9) is an increment factor (e.g. a constant s=0.2).

Figure 4:
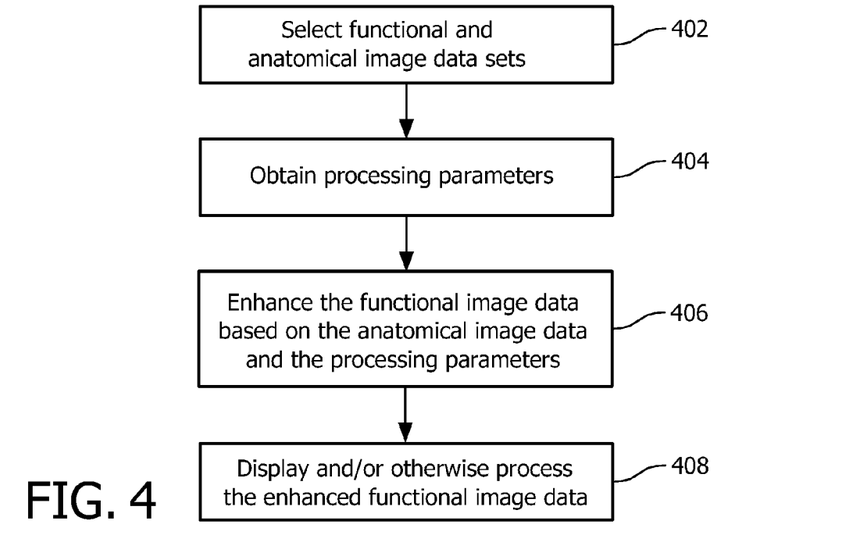
FIG. 4 illustrates example workflow for functional image data enhancement.

FIG. 4 illustrates example workflow for functional image data enhancement. At 402, an authorized user, such as a physician, a radiologist, a technician or the like, selects functional image data and anatomical image data, for example, a PET image data and a corresponding CT image data. Otherwise the input data can be selected automatically.

At 404, obtain one or more processing parameters. As discussed herein, suitable parameters include sharpness, adaption, and background. The sharpness parameter determines a sharpening level of the functional image data, the adaptation parameter defines a level of the functional image data to anatomical image data correlation-dependent morphological adaption, the background parameter defines a coarse-range of intensities in the functional image data that are considered as background-uptake. As described herein, these parameters may include default and/or user defined parameters.

At 406, the functional image data is enhanced based on the anatomical image data and the parameters. The enhanced functional image data may include indicia that identify the image data as enhanced functional image data. In one instance, this facilitates distinguishing the original image data from the enhanced image data.

At 408, the enhanced functional image data is displayed and/or otherwise processed. The enhanced functional image data can be displayed and/or otherwise processed in connection with the original functional image data, the anatomical image data, and/or other image data.

Figure 5:
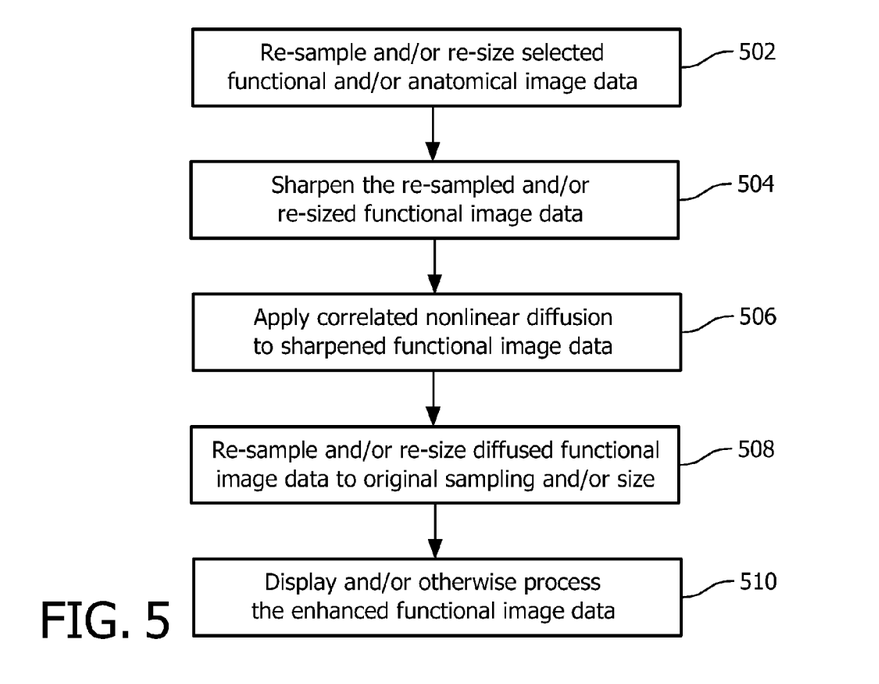
FIG. 5 illustrates an example method for functional image data enhancement, including adapting and smoothing the functional image data.

FIG. 5 illustrates an example method for functional image data enhancement, such as in connection with act 406 of FIG. 4.

At 502, the functional image data and/or the anatomical image data are re-sampled and/or re-sized to fit a same voxel size and positions.

At 504, a sharpening algorithm is applied (e.g., equally) to the entire or a predetermined subset of the processed functional image data.

At 506, correlated nonlinear diffusion is applied to the sharpened functional image data to produce enhanced functional image data. In one instance, this includes adapting and smoothing the functional image data, for example, as described in connection with FIG. 6 below or otherwise.

At 508, the processed functional image data is downsampled and/or re-sized to the original functional image data voxel size and/or positions.

At 510, the enhanced functional image data is displayed and/or otherwise utilized, for example, alone or in connection with the original functional image data, the anatomical image data, and/or other data.

Figure 6:
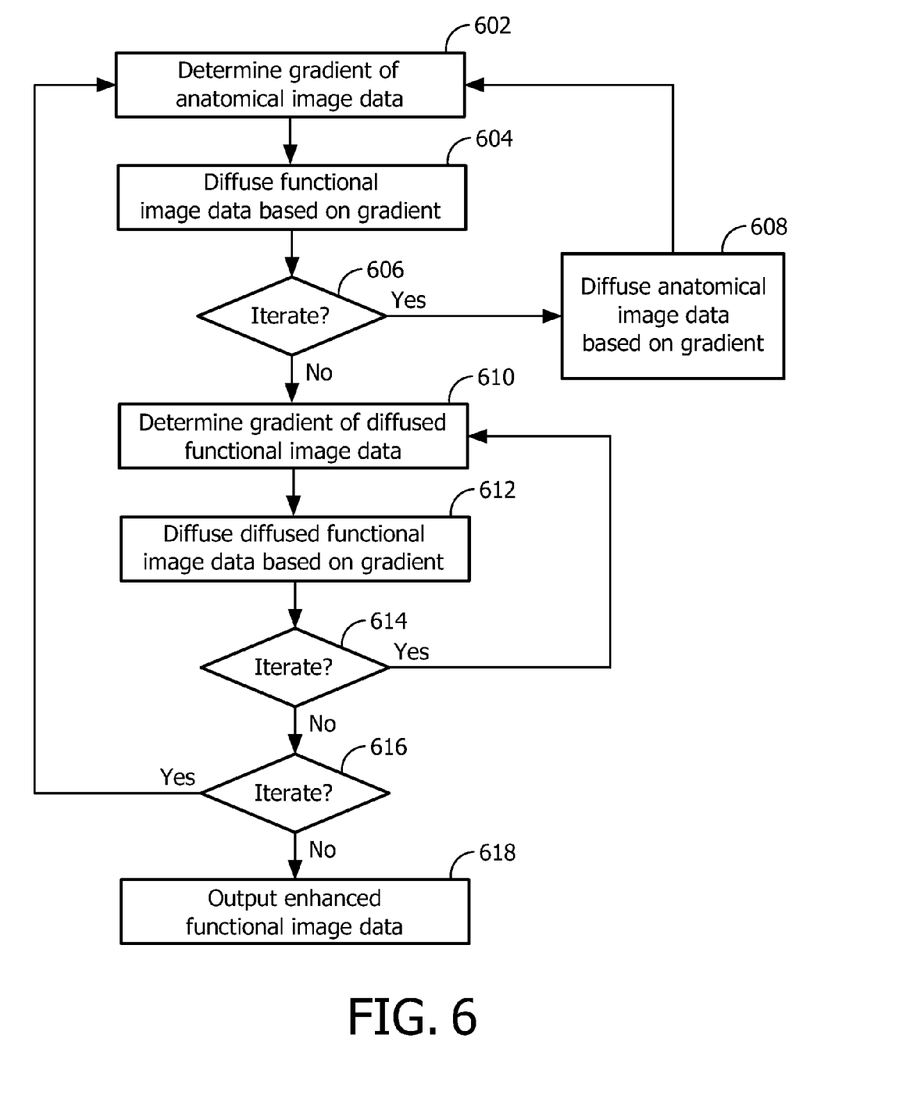
FIG. 6 illustrates an example method for adapting and smoothing the functional image data.

FIG. 6 illustrates an example method for adapting and smoothing the functional image data, such as in connection with act 506 of FIG. 5.

At 602, a gradient of the anatomical image data is determined.

At 604, the gradient is employed to diffuse (smooth and/or edge-enhance and/or de-form) the functional image data.

At 606, it is determined whether acts 602 and 604 are to be repeated for the diffused functional image data.

If so, then at 608 the gradient is employed to diffuse the anatomical image data, and acts 602-606 are repeated using the diffused functional and the diffused anatomical image data.

If not, then at 610 a gradient of the diffused functional image data is determined.

At 612, the gradient is employed to diffuse the diffused functional image data.

At 614, it is determined whether acts 610 and 612 are to be repeated for the diffused functional image data. Likewise, the number of iterations can be preset.

If so, then acts 610-614 are repeated using the output functional image data from act 614.

If not, then at 616 it is determined whether acts 602-614 are to be repeated using the processed functional image data from the last step of 612, the processed anatomical image data from the last step of 608, and updated processing parameters.

At 618, the enhanced functional image data is output.

The above acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A method for enhancing functional image data, comprising:
    obtaining functional image data;
    obtaining anatomical image data corresponding to the functional image data; and
    generating enhanced functional image data by diffusing the functional image data based on the functional image data and the anatomical image data using a correlated non-linear diffusion algorithm.

2. The method of claim 1, generating the enhanced functional image data, comprising:
    adapting structure in the functional image data to structure in the anatomical image data based on a correlation between the structures in the functional image data and the anatomical image data.

3. The method of claim 1, further comprising:
    iteratively applying the algorithm, wherein for successive iterations, the algorithm is applied with a higher strength on a low-gradient region, relative to a previous iteration.

4. The method of claim 3, wherein for successive iterations, a gradient value which differentiates between the low-gradient region and a high gradient region is reduced relative to the previous iteration.

5. The method of claim 1, further comprising:
    sharpening the functional image data prior to enhancing the functional image data.

6. The method of claim 5, wherein the sharpening is applied homogenously to the functional image data.

7. The method of claim 1, further comprising:
    adapting the functional image data morphology to anatomical image data morphology.

8. The method of claim 7, wherein adapting includes:
    a) determining a gradient for the anatomical image data;
    b) smoothing the anatomical image data based on the gradient; and
    c) smoothing and/or edge-enhancing and/or de-forming the functional image data based on the gradient and the smoothed anatomical image data.

9. The method of claim 8, further comprising:
    repeating acts a)-c) using the smoothed anatomical image data and the smoothed/edge-enhanced/de-formed functional image data for a predetermined number of times.

10. The method of claim 9, further comprising:
    d) determining a gradient of the intermediate enhanced functional image data; and
    e) smoothing the intermediate enhanced functional image data based on the functional image data gradient.

11. The method of claim 10, further comprising:
    repeating d)-e) using the smoothed functional image data for a predetermined number of times.

12. The method of claim 11, further comprising:
    upsampling at least one of the functional image data or the anatomical image data prior to enhancing the functional image data.

13. The method of claim 12, further comprising:
    downsampling the enhanced functional image data based on the sampling of the original functional image data.

14. A non-transitory computer readable storage medium encoded with instructions which, when executed by a processor of a computer, cause the computer to perform the step of:
    generating adapted functional image data in which structure in functional image data is adapted to structure in anatomical image data based on a correlation between the structure in the functional image data and the anatomical image data; and
    smoothing the adapted functional image data based on a gradient of the adapted functional image data.

15. A method for enhancing functional image data, comprising:
    obtaining functional image data;
    obtaining anatomical image data corresponding to the functional image data;
    generating enhanced functional image data by diffusing the functional image data based on the functional image data and the anatomical image data; and
    sharpening the functional image data prior to enhancing the functional image data.

16. The method of claim 15, generating the enhanced functional image data, comprising: adapting structure in the functional image data to structure in the anatomical image data based on a correlation between the structures in the functional image data and the anatomical image data.

17. The method of claim 15, further comprising: generating the enhanced functional image data using a correlated non-linear diffusion algorithm.

18. The method of claim 17, further comprising:
    iteratively applying the algorithm, wherein for successive iterations, the algorithm is applied with a higher strength on a low-gradient region, relative to a previous iteration.

19. The method of claim 18, wherein for successive iterations, a gradient value which differentiates between the low-gradient region and a high gradient region is reduced relative to the previous iteration.

20. The method of claim 15, wherein the sharpening is applied homogenously to the functional image data.

21. The method of claim 15, further comprising: adapting the functional image data morphology to anatomical image data morphology.

22. The method of claim 21, wherein adapting includes:
a) determining a gradient for the anatomical image data;
b) smoothing the anatomical image data based on the gradient; and
c) smoothing and/or edge-enhancing and/or de-forming the functional image data based on the gradient and the smoothed anatomical image data.

23. The method of claim 22, further comprising:
repeating acts a)-c) using the smoothed anatomical image data and the smoothed/edge-enhanced/de-formed functional image data for a predetermined number of times.

24. The method of claim 23, further comprising:
d) determining a gradient of the intermediate enhanced functional image data; and
e) smoothing the intermediate enhanced functional image data based on the functional image data gradient.

25. The method of claim 24, further comprising:
repeating d)-e) using the smoothed functional image data for a predetermined number of times.

26. The method of claim 25, further comprising:
upsampling at least one of the functional image data or the anatomical image data prior to enhancing the functional image data.

27. The method of claim 26, further comprising:
downsampling the enhanced functional image data based on the sampling of the original functional image data.

* * * * *